May 27, 1924.
1,495,187
N. A. LAURY
APPARATUS FOR THE CONVERSION OF SULPHATES OF ALKALI METALS AND
ALKALINE EARTHS TO SULPHIDE
Filed Nov. 16, 1921
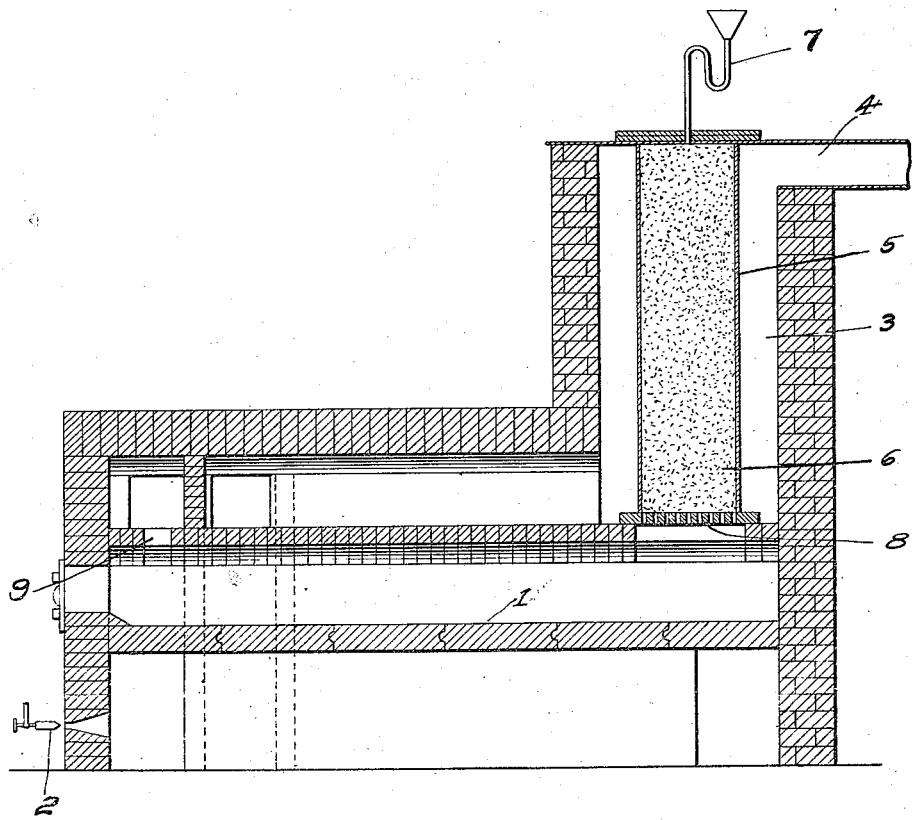
INVENTOR
Napoleon Arthur Laury
BY Merrell E Clark
ATTORNEY Patented May 27, 1924.

1,495,187

UNITED STATES PATENT OFFICE.

NAPOLEON ARTHUR LAURY, OF ROCKVILLE CENTER, NEW YORK.

APPARATUS FOR THE CONVERSION OF SULPHATES OF ALKALI METALS AND ALKALINE EARTHS TO SULPHIDE.

Application filed November 16, 1921. Serial No. 515,487.

*To all whom it may concern:*

Be it known that I, NAPOLEON ARTHUR LAURY, a citizen of the United States, and a resident of Rockville Center, Nassau County, State of New York, have invented new and useful Improvements in Apparatus for the Conversion of Sulphates of Alkali Metals and Alkaline Earths to Sulphide.

My invention relates to apparatus for the conversion of sulphates of alkali metals and alkaline earths to sulphides.

The primary object of my invention is to provide an apparatus whereby this conversion may be accomplished efficiently and inexpensively.

Barium sulphate and sodium sulphate may be taken as examples of the materials which I may convert into sulphides in the manner hereinafter described.

In the manufacture of barium sulphide as carried out at present, barium sulphate or barytes is reduced by carbon, the finely ground barytes being mixed with coal and heated in a rotary furnace to a high temperature, by a separate coal fire. With this process it is difficult to obtain a good reduction even when a high temperature is used, and at best the action is prolonged and results in some of the barium being converted to barium carbonate and then lost.

So also sulphide of soda is now commonly manufactured by reduction of sulphate of soda mixed with coal or coke in reverberatory, shaft or rotary furnaces. It is drawn from these furnaces in a very crude form containing about 60% of sulphide of soda mixed with sodium carbonate, unreduced sodium sulphate, unburned coal and coal ashes. This crude material has to be leached to dissolve out the sulphide, the other soluble salts also going into solution. The muddy liquor then has to be filtered to remove insolubles and then concentrated to separate the less soluble carbonate and sulphate of soda, and finally crystallized or solidified for sale.

The leaching and subsequent steps involve a considerable loss of materials as well as a heavy expense for labor and fuel and maintenance of equipment. It is difficult and expensive to recover the carbonate as a by-product and it is usually allowed to go to waste.

It is known that sulphates such as those above referred to may be reduced by subjecting them, while heated, to the action of hydrogen. Pure hydrogen is too expensive to make its use for this purpose desirable. However, I have discovered that hydrogen mixed with certain other gases such as nitrogen or methane and other hydrocarbons will produce the same result as pure hydrogen. And such a combination of gases can be obtained very inexpensively in the manner which I will describe more fully hereinafter. It is important, however, that the hydrogen used for reduction be free from oxides of carbon, for if such oxides are present some carbonate will be formed, which is of course undesirable.

Broadly stated, then, my invention contemplates an apparatus for the reduction of sulphates of alkali metals and alkaline earths by heating them in the presence of inexpensive hydrogen containing gases which are free from oxides of carbon.

These inexpensive hydrogen containing gases may be obtained from many different sources. For example, producer gas or water gas may be used after the removal of oxides or carbon, as may also coal gas and coke oven gas. Other gases which may be used include the mixtures of hydrogen and hydrocarbons produced by catalytic or other known methods from natural gas, mineral oil, tar, tar distillates or acetylene. The gas produced from mineral oil is especially efficient, relatively small quantities being required to complete the reduction of the sulphate. The efficiency of such oil gas is, I believe, due to the fact that under certain conditions, at least, its carbon content, as well as its hydrogen content, acts as a reducing agent.

The reduction of sulphate in the manner contemplated by this invention may be carried out in any suitable type of furnace, heated in any desired manner, as by oil, coke, coal, electricity, etc. In the accompanying drawing I show one particular form of furnace which I have found satisfactory for the purpose. This furnace is shown herein merely as illustrative of the many types of furnace which may be employed.

The furnace shown is an oil fired muffle upon the floor 1 of which is placed the barytes, salt cake or other sulphate to be reduced, and which may be heated up to as high as 1000° C. by means of the oil burner 2. The combustion gases pass through the furnace in the usual manner and up through the flue 3 and out to the stack at 4.

Within the flue 3 is the pipe or chamber 5 which is filled with granulated calcined magnesite or a similar catalytic agent as indicated at 6, and is provided at the top with an inlet 7, and at the bottom with an outlet 8.

In carrying out my process in this furnace the barytes, salt cake or other sulphate, is spread out on the floor 1 and the furnace is heated by the oil flame from the burner 2. The combustion gases, in passing out through the flue 3 serve to heat the chamber 5 and its contents. Into the chamber 5 is admitted, through the inlet 7, the oil from which the hydrogen carrying gas is to be produced. The oil after passing through the heated catalytic chamber 5 passes through the outlet 8 into the muffle, in the form of a hydrogen carrying gas which is free from oxides of carbon. It then acts upon and reduces the sulphate on the floor 1. The residual gases pass through the flue 9 and finally pass out through the main flue 3 where their combustion assists in heating the catalytic chamber. This action is continued until the entire charge of barytes has been reduced and may be repeated indefinitely for subsequent charges.

The advantages of my new apparatus over those heretofore used are apparent from the above. By its use I am enabled to produce pure sulphides at a minimum expense.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. A reducing furnace comprising a chamber within which the material to be reduced is placed, means for heating said chamber and material, a flue through which the combustion gases from said furnace pass, a catalytic chamber located in said flue and containing a catalyst capable of separating free hydrogen from fluids containing combined hydrogen, said catalytic chamber being adapted to be heated by said gases, means through which a fluid may be introduced into said catalytic chamber, and means whereby the fluid so introduced after having been acted upon in said catalytic chamber passes into contact with said material and reduces it.

2. A reducing furnace comprising a chamber within which the material to be reduced is placed, means for heating said chamber and material, a flue through which the combustion gases from said furnace pass, a catalytic chamber located in said flue and containing a catalyst capable of separating free hydrogen from fluids containing combined hydrogen, said catalytic chamber being adapted to be heated by said gases, means through which a fluid may be introduced into said catalytic chamber, means whereby the fluid so introduced after having been acted upon in said catalytic chamber passes into contact with said material and reduces it, and means whereby a portion of said fluid passes into said flue and assists in heating said catalytic chamber.

3. A reducing furnace comprising a chamber within which the material to be reduced is placed, a catalytic chamber containing a catalyst capable of separating free hydrogen from fluids containing combined hydrogen, means for heating said chambers, means through which a fluid containing combined hydrogen may be introduced into said catalytic chamber, and means whereby such fluid after having been acted upon in said catalytic chamber passes into contact with said material and reduces it.

NAPOLEON ARTHUR LAURY.